A. H. WEGENER.
NUT LOCK.
APPLICATION FILED MAR. 5, 1913.
1,084,680. Patented Jan. 20, 1914.
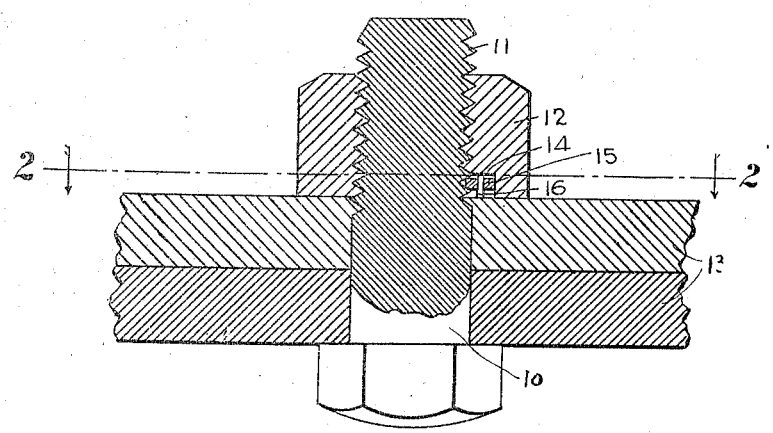
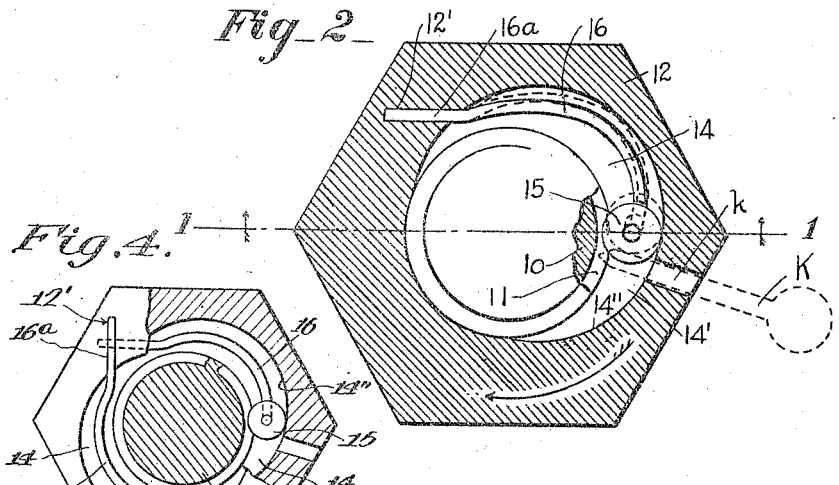
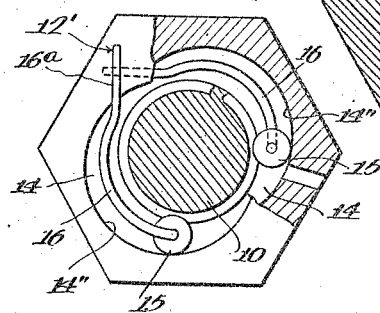
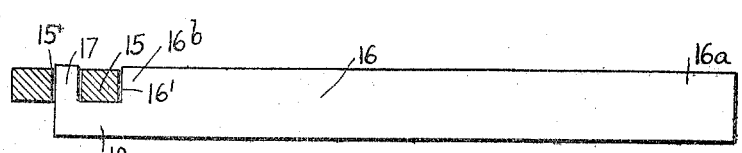
WITNESSES
Frank C. Palmer
Geo. L. Beeler
INVENTOR
Arnold Heinrich Wegener
BY
ATTORNEYS

UNITED STATES PATENT OFFICE.

ARNOLD HEINRICH WEGENER, OF HOBOKEN, NEW JERSEY.

NUT-LOCK.

1,084,680. Specification of Letters Patent. Patented Jan. 20, 1914.

Application filed March 5, 1913. Serial No. 752,062.

*To all whom it may concern:*

Be it known that I, ARNOLD HEINRICH WEGENER, a citizen of the United States, and a resident of Hoboken, in the county of Hudson and State of New Jersey, have invented a new and Improved Nut-Lock, of which the following is a full, clear, and exact description.

This invention relates to nut locks of that type in which there is a rotary member constituting under certain conditions a wedge preventing by its coöperation between the bolt and tapering portion of the nut a movement of the nut in a certain direction.

Among the objects of this invention is to simplify and hence cheapen this type of nut locks and at the same time make them more efficient than those heretofore proposed.

The foregoing and other objects of this invention will hereinafter be more fully described and claimed and illustrated in the drawings forming a part of this specification in which like characters of reference indicate corresponding parts in all the views, and in which—

Figure 1 is a vertical sectional view on the line 1—1 of Fig. 2; Fig. 2 is a transverse section on the line 2—2 of Fig. 1; Fig. 3 is a detail of the locking roller and means to control its position, and Fig. 4 is a modification showing a nut having two locking rollers, one on the outside, and the other on the inside, the figure being in section on a plane corresponding to Fig. 2 to disclose the inner roller.

The several parts of this device may be made of any suitable materials and the relative sizes and proportions, as well as the specific design thereof, may be varied to a considerable extent without departing from the spirit of the invention hereinafter claimed.

At 10 I show a bolt of conventional form and having a thread 11 upon which a nut 12 is mounted and operated in the usual manner for the purpose of securing the bolt in place as when clamping certain parts represented at 13 together. The nut is shown provided with a crescent-shaped recess 14 formed preferably by a rotary milling cutter upon either the inner or outer face of the nut 12, or in certain instances, I may form such recesses on both the inner and outer faces, as shown in Fig. 4. As shown in Fig. 2, the recess 14 is cut eccentrically of the axis of the bolt and nut, whereby there is formed a tapering space 14' at each end of the recess 14, and coöperating in one of such ends is a roller 15. The roller is preferably secured within the recess and at a substantially definite position therein by a peculiarly formed spring 16. With the recess formed as above indicated, it is provided with a substantially smooth cylindrical wall 14 against which the roller bears radially of the bolt. The inner portion of the roller bears substantially against the threaded portions of the bolt, and if not too thick it will engage preferably between two adjacent threads thereof. The roller may be of any desired construction or form, but as shown it comprises a disk having a central hole 15'.

The spring 16 is notched out as indicated at 16' and is provided with a pintle or finger 17 which extends through the aforesaid disk hole 15'. The depth of the notch 16' is preferably slightly greater than the thickness of the disk, and the width of the notch is substantially equal to the radius of the disk outside of the hole 15', whereby the spring normally acts upon the disk at two different parts.

The nut 12 is provided with a cut or kerf 12' extending through the side wall 14" of the recess 14 into which the end 16ª of the spring is secured. Said kerf may extend as far outward toward the outside of the nut as desired, but preferably it is hidden, as shown in Fig. 2, so that the nut locking mechanism is all substantially housed within the nut when in use. Said kerf 12', while opening into the recess 14, is preferably arranged so as to form an angle with the wall 14" so that when the spring 16 extends from the kerf into and along the recess 14 it may not normally engage the wall 14", the normal position and form of the spring being indicated in Fig. 2 with the roller 15 in substantial engagement with the wall 14" and the thread 11 of the bolt.

Upon turning the nut in the direction indicated by the arrow on Fig. 2, the contact between the roller and the other parts will tend to cause the roller to move toward the dotted line position and in which position the roller will have no wedging or locking effect. In other words, the rotation of the nut, the bolt remaining stationary, will tend to cause the roller to approach the widest portion of the recess 14, it being understood that the roller normally lies within one of the tapering ends 14' of said recess. By reason, however, of the normal tendency of the spring to maintain the roller in contact with both the nut and bolt, any attempt to turn the nut in the opposite direction will be resisted positively by reason of the roller wedging snugly in the tapering portion of the recess.

The description of operation just given will be understood as being applicable to this locking device when applied to either the inner or outer face of the nut and also regardless of the direction in which the spring is set; that is to say, under certain conditions it may be desired to reverse the position shown in Fig. 2, in order to make the lock effective to prevent the turning on of the nut while allowing free rotation for the removal of the nut. It will be seen, therefore, that if a nut be provided with two cavities, one on the inner face and the other on the outer face, with a locking roller in each, and each of the rollers applied to its recess in the direction in which the nut is to be turned on, if that particular face be considered as the inner one one of the rollers will resist such turning and the other will resist turning in the opposite direction. In order to release the roller so as to render it inoperative for its locking purpose, a key K shown in dotted lines in Fig. 2 may be introduced through a notch k formed in the nut, the point of the key pushing the roller toward the widest portion of the recess. When the key is thus inserted the nut may be turned freely in a reverse direction.

As illustrated, the spring 16 serves to hold the roller 15 in proper position at all times except when the key is applied. The spring at its neck portion 18 prevents lateral movement of the roller from the nut, and even though the pintle 17 become rusted or broken off, the shoulder $16^b$ bearing against the periphery of the roller will still maintain it in position to grip and prevent unscrewing of the nut.

Having thus described my invention, I claim as new and desire to secure by Letters Patent:

1. The herein described nut lock comprising, in combination with a bolt, a nut turned upon the bolt, said nut having a crescent-shaped recess formed in one face eccentrically of the axis of the bolt, said recess having a smooth wall, a roller mounted in the end of said recess between the bolt and said wall, and a spring having one end embedded in the nut and the other end abutting against said roller, the intermediate portion of the spring being spaced from the nut within said recess.

2. The herein described nut lock comprising a bolt having a threaded end, a nut coöperating therewith, said nut having a tapered recess formed therein adjacent the bolt, a roller located in said recess and having a central hole, a spring located in the recess beyond the roller, said spring having a shoulder bearing against the periphery of the roller and also having a pintle extending through said hole and serving to maintain the roller in gripping position, and means to unlock the roller, substantially as set forth.

In testimony whereof I have signed my name to this specification in the presence of two subscribing witnesses.

ARNOLD HEINRICH WEGENER.

Witnesses:
GEO. L. BEELER,
PHILIP D. ROLLHAUS.